United States Patent Office 3,741,877
Patented June 26, 1973

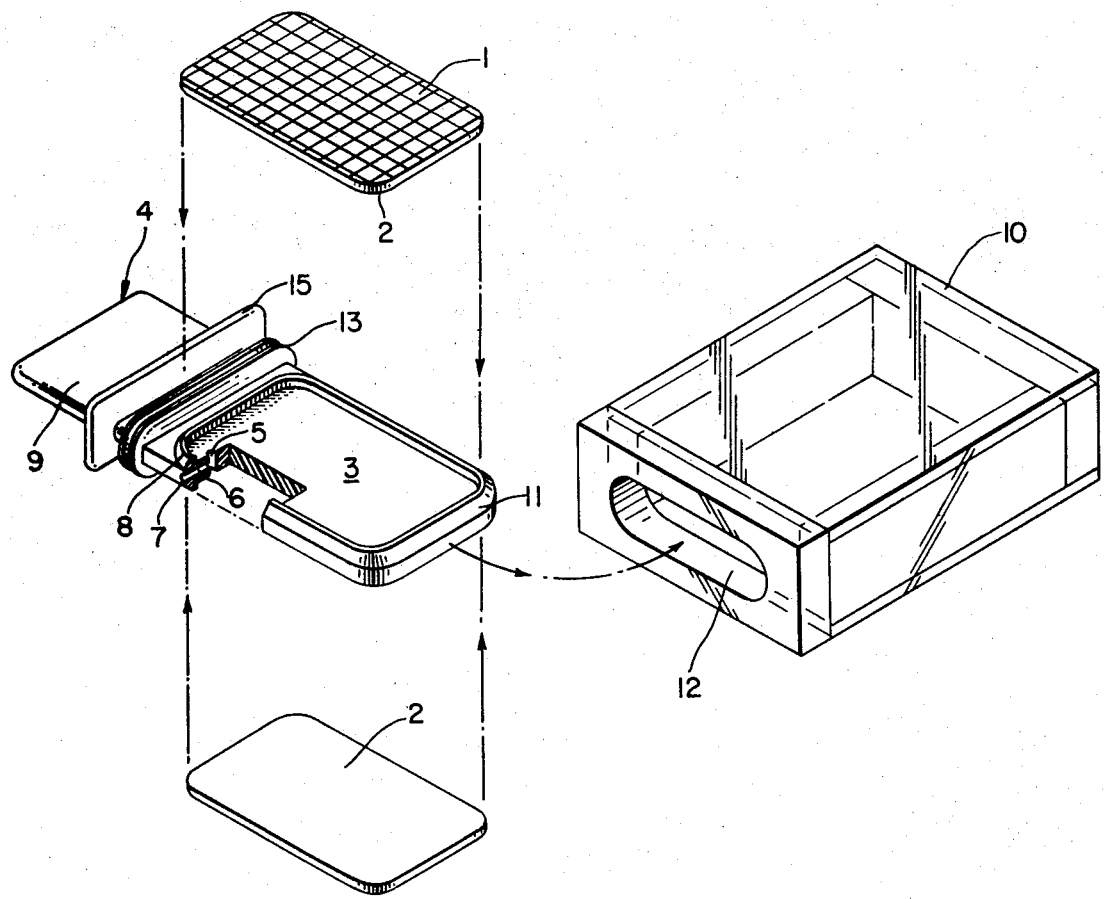

3,741,877
METHOD AND APPARATUS FOR COLLECTING
AND GROWING MICRO-ORGANISMS
Charles P. Shaufus, Waltham, Robert E. Rose, Chelmsford, and Donald B. Rising, Stow, Mass., assignors to Millipore Corporation, Bedford, Mass.
Filed May 22, 1970, Ser. No. 39,759
Int. Cl. C12k 1/00
U.S. Cl. 195—127
6 Claims

ABSTRACT OF THE DISCLOSURE

A construction for collecting and growing micro-organisms obtained from an aqueous solution comprising a filter sealed to one surface of an absorbent pad containing a nutrient for the micro-organisms. The micro-organisms in aqueous solution are filtered through the filter under the capillary action of the pad. The micro-organisms are deposited on the filter and the aqueous solution passed into the pad provides a vehicle for contacting the nutrient and organisms.

---

This invention relates to a method and apparatus for collecting and growing a microbiological sample.

Presently, an aqueous solution is analyzed for microbiological content by drawing it through a membrane filter to deposit micro-organisms in the solution on the filter surface. The filter then is transferred to a petri dish containing agar or a cellulosic pad saturated with nutrient. The sample and nutrient then are incubated for a period of about 24 hours or more or less until the micro-organisms have produced colonies sufficiently large to afford visual micro or macroscopic examination. By regulating the type of nutrient and incubation conditions, the organisms can be identified by their growth, color or other visually determinable characteristics.

Present procedures for obtaining and incubating a microbiological sample are cumbersome, time consuming and involve the risk of contaminating the sample from outside sources. This is particularly evident when analyzing samples containing only low concentrations of micro-organisms. Generally, the sample is obtained by drawing the aqueous solution through a filter by a means of a vacuum imposed on one side of the filter. The filter then is removed from its support and transferred to contact a nutrient medium and is incubated as described above. This transfer is undesirable since the risk of contamination is increased.

It would be highly desirable to provide a means for analyzing solutions for micro-organisms whereby complexity of the apparatus employed would be reduced. In particular it would be desirable to eliminate the need of providing a vacuum or pressure to permit analyses in the field. Furthermore, it would be desirable to provide a means for performing the assay whereby the handling of the filtered sample is reduced to reduce the risk of contamination and render the procedure particularly adaptable for analyzing solutions with suspected microbiological contamination.

In accordance with this invention, there is provided a filter bonded to an absorbent pad containing nutrient material for the growth of micro-organisms. The filter and pad are adapted to be retained by a holder that facilitates sample collection and incubation. In use, the filter-pad construction is placed in the holder so that the solution is filtered prior to contacting the pad. The holder is provided with a handle so that the operator need not touch the filter during sample collection or transfer to incubation.

When employing this invention the microbiological sample can be collected and thereafter incubated without the need for employing a vacuum or for handling the filter surface upon which the sample is deposited. It is particularly adaptable for analyzing aqueous solutions containing relatively low concentrations of micro-organisms. The filter-pad construction retained in the holder is dipped into the solution to be analyzed for a period of time to draw the solution by capillary action, through the filter and into the pad. A hole is provided in the handle to communicate with the underside of the pad and thereby not inhibit the capillary action. The filter pores permit passage of the solution while effecting retention of the micro-organism on the filter surface. After the sample has been collected, the construction is removed from the solution, placed in an incubation chamber and sealed from the surrounding atmosphere. The seal can be effected by protrusions from the handle construction that tightly forms with the opening of the incubation chamber.

A more detailed description of the invention is provided by reference to the accompanying drawing.

The figure is an exploded isometric view of the handle, pad, filter and incubation chamber.

Referring to the figure, the filter 1 is bonded to an absorbent pad 2 to form a unitary construction. The method of bonding does not prevent passage of a liquid through the filter surface 1 into the pad 2. The construction shown in the figure is capable of accommodating two separate unitary filter-pad constructions. Each of the filter-pad constructions fits into a recess 3 in handle 4. Each recess is provided with an opening 5 that communicates with the outside atmosphere through conduit 6 and opening 7. During sample collection when the filter and pad are dipped into the aqueous solution, the liquid passes through the filter 1 and into the pad 2 and the air replaced in the pad 2 by the solution passes through opening 5: conduit 6 and out through opening 7. The filter 1 and pad 2 are retained in the recess 3 by means of wall 8 that surrounds recess 3. After the filter has been placed in recess 3, the wall 8 can be heat treated to melt and spread onto the outside perimeter of the filter 1 and then cool. Thus, the wall 8 and handle 4 can be made of a heat sensitive polymeric material such as polyethylene or polypropylene.

The handle 4 not only retains the pad and filter, but also facilitates quick transfer of the filter to an incubation chamber and sealing therein without handling the filter. The handle 4 is grasped at end 9 and transferred to the incubation chamber 10. The end 11 of handle 4 is inserted first into the incubation chamber 10 through opening 12. Sealing member 13 on handle 4 compliments the inside surface of opening 12 and forms a tight seal against the atmosphere. Stop 15 prevents the handle 4 from being inserted too far into the incubation chamber thus guaranteeing that the sealing member 13 and the inside surface of the opening 12 are always in contact during incubation. In this manner the seal is maintained for the desired incubation period.

The nutrient is impregnated in the pad either prior to or after bonding the filter thereto. The nutrient should be stable, i.e., not readily oxidizable, especially when dry and should be available to promote growth of the micro-organism on the filter when admixed with the liquid that passes through the filter. The liquid medium functions to deliver the nutrients to the filter surface thereby promoting growth of the micro-organism thereon. Any nutrient medium presently available in a stable dry form can be employed in the pad. The nutrient medium also can contain indicator dyes that perform in a manner well-known in the art. Generally, these dyes produce a color in the colony as a result of the metabolism of the organism in a well-known manner. Gelatin also can be impregnated in the pad to reduce migration of nutrient during sample collection.

When the filter is immersed in the solution to be analyzed, the solution migrates through the filter into the pad by capillary action. No other outside force is needed to obtain deposition of the micro-organisms on the filter surface which are retained by Van der Waal forces. Thus, the means employed to bond the filter and pad should not materially restrict the capillary action driving force. Accordingly, the adhesive employed for bonding is porous to permit passage of liquid therethrough. Furthermore, when testing aqueous solutions, it is desirable that the adhesive itself be hydrophilic rather than hydrophobic in order to further promote the capillary action. A particularly suitable adhesive comprises polymeric fibers that can be melted at relatively low temperatures. The fibers comprise a porous layer adhered to both the pad and the filter to form a unitary construction. Bonding can be effected easily by heat-sealing the pad and filter under pressure in either a platen press or in the nip of a roller system. The heat-sealing temperature should not be so high as to reduce the porosity of the filter or degrade the nutrient medium. Generally, heat-sealing is effected at a temperature of between about 100° C. and 150° C.

The size of the filter-pad construction and the corresponding size of the recess into which it is fitted depends upon the approximate amount of sample desired to be taken. For example, when it is desired to filter approximately 1 ml. of solution through the filter, the filter construction has a surface area of about 1.60 sq. inches and a thickness of about $\frac{1}{16}$ of an inch when dry. To assure that all of the aqueous solution passing into the pad passes through the filter, the perimeter of the filter is sealed to prevent initial contact thereof with the soluion. This can be easily and quickly effeced by heating the wall of the recess into which the pad fits to melt the surrounding material and form a seal to cover only a small portion of the filter surface at the perimeter. This method of sealing the perimeter is preferred since the plastic composition does not wet the pad and therefore does not migrate therein.

Any suitable filter material can be employed including porous cellulose esters such as cellulose nitrate, cellulose acetate or mixtures thereof. These filters generally have a pore size between about .1 and .8 micron and are commercially available from Millipore® Corporation as VM, HA, GS, or AA filters.

Suitable absorbent pad materials include cellulose, preferably cotton base cellulose or other non-toxic absorbent hydrophilic materials.

In use, the pad and filter construction held into the handle are dipped in the aqueous solution to be analyzed for a sufficient period of time to saturate the pad with aqueous solution. This generally requires less than a minute and usually about thirty seconds. The handle and filter are then removed from the solution and placed into an incubation chamber wherein any micro-organisms on the filter will grow. Adequate growth to provide visual inspection of the colonies usually occurs within about 18 hours. It is preferred that incubation be complete in less than about 48 hours since the water will evaporate from the pad thereby rendering the nutrient unavailable to the micro-organism for growth. While the invention has been described above with reference to a particular handle constuction, it is to be understood that any handle construction can be employed so long as it retains the filter and pad, and provides a means for transferring the filter to an incubation chamber without handling the filter. Furthermore, it is desirable that the handle provide a means for sealing the filter and pad in the incubation chamber during incubation and provide a means for air escape during absorbtion of the solution by the pad.

Furthermore, it is to be understood that the filter and pad construction can be employed without the handle if desired so long as the solution to be tested initially contacts only the filter and not the pad. Thus, the perimeter of the pad can be sealed to exclude liquid from passing therethrough and the filter can be positioned to contact the liquid.

The following example illustrates the present invention and is not intended to limit the same.

EXAMPLE I

A filter-pad construction was prepared by laminating a cellulose fiber pad about $\frac{1}{16}$ of an inch thick to a Millipore® HA filter having an average pore size of about .45 micron. The lamination was effective by interposing vinyon and polyester fibers between the filter and pad and heat-sealing between heated platens. The resultant construction was cut to a size to fit into a recess of a polyethylene holder constructed as shown in the drawing.

Prior to the lamination, the cellulose pad was saturated with a nutrient medium comprising an aqueous solution of the composition in Table I.

TABLE I

| | G./liter |
|---|---|
| Trypticase soy broth | 60 |
| Yeast extract | 5 |
| Granular gelatin | 12 |

The gelatin is added to reduce the migration of the nutrient medium during rehydration.

The composition of Table I was heated gently in a water bath at 60° C. while agitating to dissolve the composition. The solution was then autoclaved at 121° C. for 15 minutes. The pad was dipped into the solution and soaked for about one minute and removed. The excess was allowed to drip off and the pad was dried on racks covered with nylon for 24 hours at 28° C.

The filter-pad construction was placed into the handle recess. The handle wall was heated by a platen to melt the polyethylene and form a seal around the periphery of the pad.

The construction described above was employed to test water from the Concord River for micro-organisms. The construction was placed in a 100 ml. beaker with the level of the sample just covering the filter surface. The construction was allowed to stand for one minute during which air bubbles were observed passing through the water from the hole in the handle. The construction then was incubated in a moisturized chamber at 35° C. for 24 hours. Micro-organism growth was observed on the filter after the incubation period.

What is claimed is:

1. A construction for collecting and thereafter growing micro-organisms comprising a filter having pores of a size to effect retention of micro-organisms, one surface of said filter being in contact with a first surface of an absorbent pad containing a nutrient for the micro-organisms, a support member for said filter and pad, the second surface of said pad being in contact with said support member, said support member being continuous and sealing the surface of said pad not in contact with the filter except for an opening therein to permit air to escape from said pad as liquid enters said pad through said filter, the edges of said filter being sealed to said support member, whereby liquid may enter said pad only through said filter.

2. The construction of claim 1 wherein the pad contains gelatin to reduce migration of the nutrient.

3. The construction of claim 1 in which said support member includes a recess formed therein to accommodate said pad and filter.

4. The construction of claim 3 wherein the periphery of the filter and pad are sealed by heat sealing the recess wall to the filter and pad.

5. The construction defined in claim 1 in which said support member includes a handle.

6. The construction of claim 5 wherein the handle has a means to provide a seal from the atmosphere when the filter and pad are placed in an incubation chamber.

References Cited

UNITED STATES PATENTS

| 2,923,669 | 2/1960 | Poitras | 195—103.5 R |
|---|---|---|---|
| 2,904,474 | 9/1959 | Förg | 195—103.5 R |

OTHER REFERENCES

"Falcon Plastic Labware," published by Falcon Plastics, 550 W. 83rd St., Los Angeles, Calif. 90045.

ALVIN E. TAVENHOLTZ, Primary Examiner

M. D. HENSLEY, Assistant Examiner

U.S. CL. X.R.

195—103.5 R